Aug. 21, 1951     C. O. GLASGOW     2,564,894
MAGNETIC PILOT VALVE
Filed July 2, 1949     2 Sheets-Sheet 2
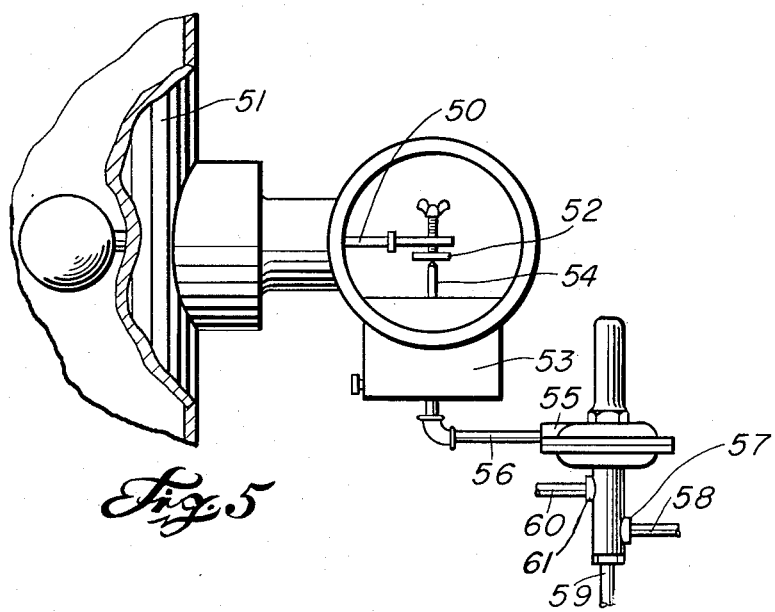
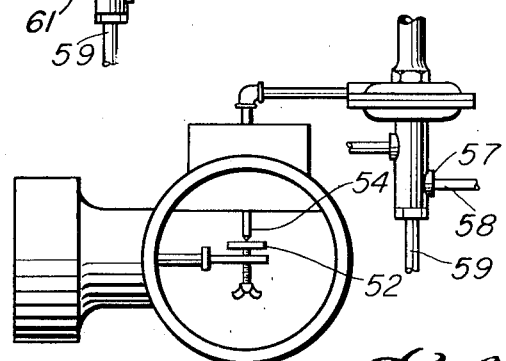
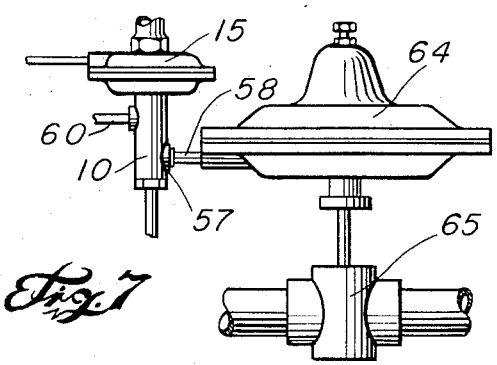
Inventor
Clarence O. Glasgow
By Ahley & Ahley Patented Aug. 21, 1951

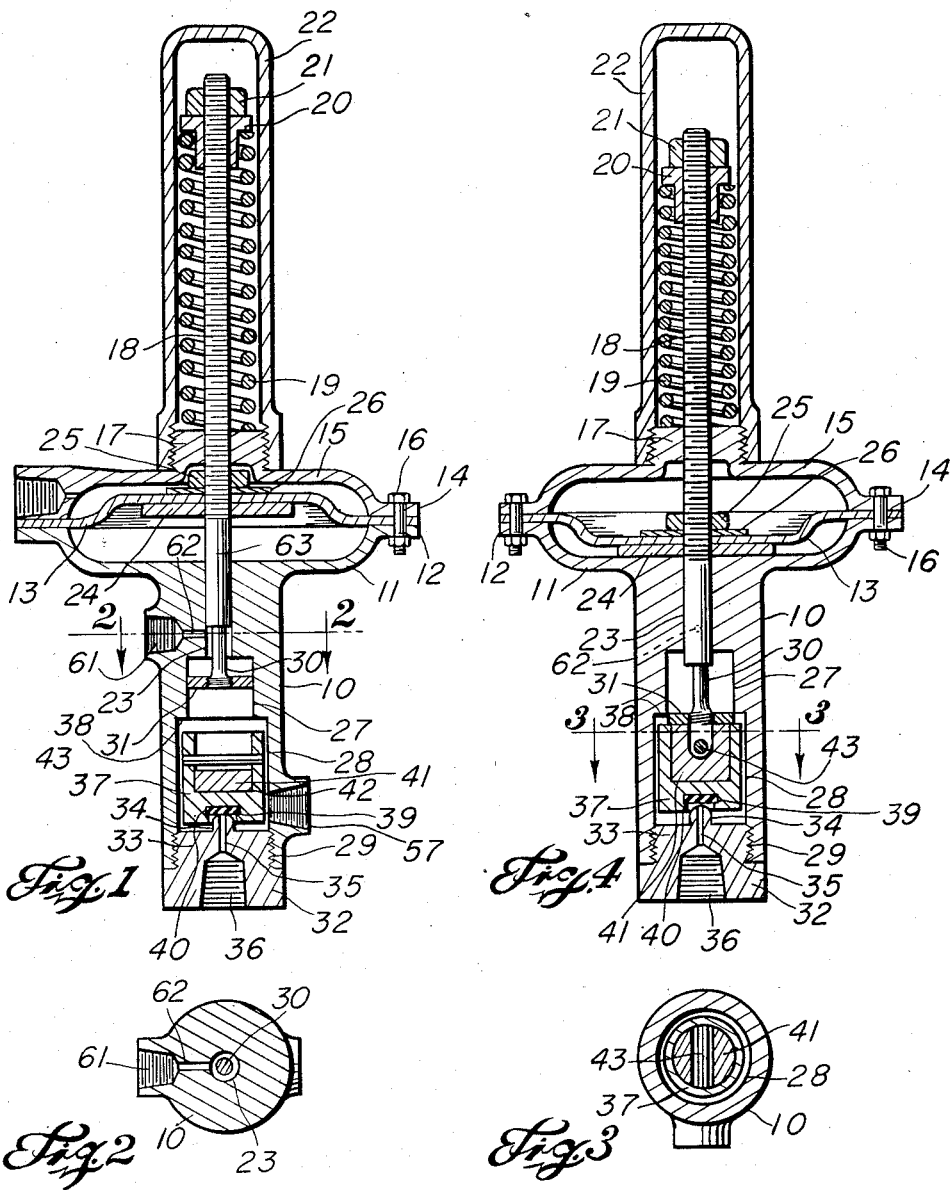

2,564,894

UNITED STATES PATENT OFFICE 2,564,894

MAGNETIC PILOT VALVE

Clarence O. Glasgow, Tulsa, Okla., assignor to National Tank Company, Tulsa, Okla., a corporation of Nevada Application July 2, 1949, Serial No. 102,797

11 Claims. (Cl. 137—139)

1

This invention relates to new and useful improvements in magnetic valves.

One object of the invention is to provide an improved magnetic valve of the diaphragm type which is opened and closed with a snap action.

Another object of the invention is to provide an improved magnetic valve having a floating valve opening and closing member carrying a magnet and diaphragm operated means for attracting and releasing the magnet for opening and closing the valve.

A further object of the invention is to provide a valve wherein the travel of the valve opening and closing member is very short so that the magnet is only required to cause the said member to move a small fraction of an inch, thus making a snap action possible.

Still another object of the invention is to provide an improved magnetic valve having a spring diaphragm, actuated stem carrying an armature co-acting with a floating seating member carrying a magnet, with means for disengaging the magnet from the armature upon upward movement of said stem and wherein the stem carries a piston for opening and closing a port in conjunction with the closing and opening of the valve.

A construction designed to carry out the invention will be hereinafter described together with other features of the invention.

The invention will be more readily understood from a reading of the following specifications and by reference to the accompanying drawings, wherein examples of the invention are shown, and wherein:

Fig. 1 is a vertical sectional view of a magnetic valve constructed in accordance with the invention and in its closed position, Fig. 2 is a horizontal cross-sectional view taken on the line 2—2 of Fig. 1, Fig. 3 is a similar view taken on the line 3—3 of Fig. 4, Fig. 4 is a vertical sectional view of the valve in its open position and at right angles to Fig. 1, and Figs. 5, 6 and 7 respectively, are three forms of hook-ups of the valve with liquid level control devices for vessels.

In the drawings the numeral 10 designates an upright body which has the lower section 11 of a diaphragm case formed integral with and overhanging its upper end. The case section 11 has an outwardly directed, annular flange 12 which receives the circular margin of an ordinary diaphragm 13. The flange 12 is con-

2 nected, by means of bolts 16, with the annular flange 14 of the upper case section 15, the bolts passing through the diaphragm which is securely held between said flanges.

The upper case section 15 has a central upstanding boss 17, which is externally screw threaded and is formed integral with said section. A vertical stem 18 is slidably mounted in said boss and has its upper portion screw-threaded. A coil spring 19 surrounding the stem has its lower end resting on the boss and its upper end surrounding a flanged follower 20, slidable on the upper end of said stem. A nut 21 screwed onto the upper end of the stem is adjusted downwardly to move the follower 20 downwardly and thus, place the spring under the desired compression. An elongate cap 22 has its lower end screwed onto the boss.

The body 10 has an axial bore 23 in its upper end opening to the diaphragm case section 11 and in which the stem 18 has a sliding fit. A disk 24 screwed onto the stem engages the under side of a diaphragm 13 while a nut 25, also screwed onto said stem, bears on a washer 26 and confines the diaphragm on the disk in the usual manner. A series of counterbores or recesses, 27, 28 and 29, respectively, extend from the bore 23 to the bottom of the body, each being successively larger, downwardly thereof.

The lower end of the stem 18 has a reduced shank 30 and an annular armature 31 is screwed onto the lower end of said shank. This armature, which has a loose position in the recess 27 is free to slide vertically in the recess. There is sufficient clearance between the periphery of the armature 31 and the annular wall of the recess 28, to permit fluid under pressure to flow past said periphery. A valve plug 32 has a reduced screw-threaded boss 33 on its top and the recess 29 is screw-threaded to receive said boss, whereby the plug may be tightened against the bottom of the body to close the same. An upstanding nipple 34 is formed integral with the center of the boss 33 and a reduced, axial duct 35 extends through the boss and nipple from the top of a screw-threaded socket 36 in the bottom of the plug.

A floating magnet holder or housing 37 is free to move vertically in the recess 28, its upward travel being arrested by an annular shoulder or arresting member 38 at the top of said recess. The center of the bottom of the housing is formed with a flanged sump 39 in which a disk seat 40 is confined. This disk may be formed of "Hycar" or other suitable seat material. When the housing is in its released or lowermost position the seat 40 rests upon the nipple 34, thus shutting off the duct 35 and the upper end of said housing is spaced below the shoulder 38, as is shown in Fig. 1.

A U-shaped magnet 41 of the "horseshoe" type is snugly fitted in a well 42 in the housing and has its upper ends terminating substantially flush with the upper surface of said housing, whereby its poles are exposed. The magnet is retained in the housing by a cross pin 43. It is preferable to use a magnet known to the trade as "Alinico" and now in common use. This magnet is of the permanent type. The parts which have been described constitute a magnetic valve. The magnet and housing are of such weight and said magnet is of such force, that the disk 40 will remain seated on the nipple 34 until the armature 31 is moved downwardly to within a short distance of the magnet; as for instance ⅛ of an inch.

When the desired magnetic position is reached the magnet will jump to the armature, thus carrying the housing 37 with it and opening the duct 35. When the armature is lifted the magnet will remain attached thereto until the housing strikes the shoulder 38, whereby the housing will be arrested, detached from said armature and released. The released housing will drop so that the seat 40 comes to rest on the nipple 34 and shuts off the duct 35. From the foregoing it will be seen that the valve opens and closes with a snap action.

This valve is particularly adapted to be used in combination with a liquid level control device. In Fig. 5, a float device 50 is mounted on a vessel 51 and operates a bleeder 52, the details of which are unimportant, since no claim is made thereto. A pressure fluid supply regulator 53 with a suitable source of pressure fluid supply has a bleeder nozzle 54 adapted to be opened and closed by the bleeder 52.

The upper casing section 15 has an internally screw-threaded inlet boss 55 and a pipe 56 connects the regulator with said boss. An internally screw-threaded boss 57 on the body 10 opens into the recess 28 above the nipple 34 and a pressure fluid feed pipe 58 leads therefrom. A pressure fluid supply pipe 59 is connected in the socket 36.

When the valve is closed as in Fig. 1, the supply of pressure fluid from the pipe 59 to the pipe 58 is shut off. The feed pipe 58 is connected to some pressure responsive device such as a diaphragm valve (not shown) and a pressure fluid exhaust pipe 60 leads from such device to a socket 61 in the body 10. A port 62 leads to the bore 23 and the lower smooth portion of the stem 18 constitutes a piston 63 for opening and closing said port. When the valve is closed, as is shown Fig. 1, the supply of pressure fluid by way of the duct 35 is shut off and the piston 63 is above the exhaust port 62, which is open.

When liquid is entering the vessel 51 and the float device 50 is in filling position the bleeder 52 will be above the nozzle 54 and consequently the regulator 53 will be bleeding, whereby the pressure fluid will escape to the atmosphere and the valve will be closed as is shown in Fig. 1. As the liquid level rises in the vessel the float device will reach a point where the bleeder 52 closes the nozzle 54 and when this occurs, pressure fluid will be conducted by way of pipe 56 to the upper case section 15 and its pressure exerted downwardly on the diaphragm 13, whereby said diaphragm will be depressed to the position shown in Fig. 4.

When the stem 18 is moved downwardly by the diaphragm 13, the piston 63 will close the exhaust port 62 and the armature 31 will be moved to the bottom of the recess 27, as is shown in Fig. 4. Upon reaching its lowermost position the armature is so close to the magnet 41, that the latter will jump to the armature and carry the housing 37 upwardly, whereby the seat 40 will be lifted from the nipple 34 and the duct 35, opened. The valve will thus be opened with a snap action. Pressure fluid from the supply pipe 59 may now flow through the duct 35, recess 28 and the boss 57 to the pipe 58 which is connected to an outlet valve (not shown) but which is thereby opened and the liquid level in the vessel 50, thus lowered.

When the float device is lowered the bleeder nozzle 54 is opened, whereby pressure fluid is exhausted from the case section 15 by way of the pipe 56 which permits the spring 19 to lift the stem 18, thus raising the housing 37 until it strikes the shoulder 38, whereby it is arrested, is detached from the armature 31 and falls until its seat 40 comes to rest on the nipple 34. The duct 35 is thus shut off and the supply of pressure fluid to the pipe 58 is discontinued. The upward travel of armature and housing is short, usually less than ⅛ of an inch. Since the upward movement of the stem 18 raised the piston 63, the exhaust 62 was opened.

In Fig. 6 the control means is inverted and the bleeder 52 remains in engagement with the nozzle 54 except when liquid is being discharged from the vessel 51. In this form the pipe 59 and socket 36 are used to exhaust fluid and the pipe 60 becomes a supply source and the port 62, admits pressure fluid. Thus when the valve is in the position shown in Fig. 1 pressure fluid from the port 62, by-passes the armature to the outlet 57 and pipe 58, but when the valve moves to the position shown in Fig. 4, the supply port 62 is closed and the exhaust 35—36 is opened.

Still another arrangement is shown in Fig. 7. Here the pressure fluid is supplied as in Fig. 5 and pipe 60 becomes the exhaust. The pipe 58 is connected to the diaphragm motor 64 of a valve 65. Pressure fluid is intermittently supplied to pipe 56 and the magnetic valve is intermittently opened and closed, as will be obvious without further explanation.

The recesses 27 and 29 constitute an enclosure or chamber within the body. The shoulder 38 may be called an arresting means or a stop. The socket 36 and the duct 35 may act as a fluid inlet or a fluid outlet and this applies to the boss 57 and the socket 61. The duct 35 may be called a passage.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A magnetic valve including a body having a chamber therein provided with a first pressure fluid passage at one end of said chamber and a second fluid passage leading through the body from the opposite end of said chamber, movement limiting means between the chamber and the second passage, a magnetic movable seat member in the chamber normally engaging and closing the first fluid passage and movable toward and engageable with the movement-limiting means, a diaphragm at one end of the body having a stem slidable in the adjacent end of the body and provided with an extension in the second fluid passage, an armature mounted on the stem extension in the body and freely movable therein toward and from said movement-limiting means so that fluid may pass around said armature and toward and from said seat member, a spring attached to the stem normally restraining movement of the diaphragm and holding the stem and armature under restraint, whereby the armature is spaced out of magnetic range of the magnetic seat member, and means for applying a pressure fluid to the diaphragm to overcome said spring restraint and move said diaphragm and stem to bring said armature into the magnetic range of said seat member.

2. A magnetic valve as set forth in claim 1, wherein the seat member includes a housing and a magnet within the housing having its ends exposed toward the armature.

3. A magnetic valve as set forth in claim 1, wherein the fluid inlet to the chamber is provided with a nipple, and a seat carried by the movable seat member engaging said nipple.

4. A magnetic valve as set forth in claim 1, with a fluid passage leading outwardly from the chamber through the side wall of the body.

5. The combination of spring pressed diaphragm means and a magnetic valve which includes, a diaphragm member, an enclosure in which the diaphragm is mounted, a stem passing through and attached to the diaphragm, resilient means attached to the stem above the diaphragm and normally holding the diaphragm elevated, a pressure fluid inlet to the enclosure above the diaphragm, a body below the enclosure having a vertical chamber therein, a first passage leading from the upper end of the chamber through the wall of the body, a second fluid passage extending through the bottom of the body to the chamber, movement-limiting means at the upper end of the chamber, a magnetic movable seat member in the chamber below the movement limiting means normally closing the second passage, the lower end of the stem extending into the first passage, and an armature on the stem extension normally elevated out of magnetic range of said magnetic movable member and movable toward and into magnetic range of said movable member to elevate said member and open the second passage when pressure fluid is applied to the diaphragm through the inlet thereto.

6. The combination set forth in claim 5, wherein the chamber has a third passage through its side wall between the second passage and the first passage, and also wherein the armature has a loose sliding movement in the exhaust passage.

7. The combination set forth in claim 5, wherein the movable seat member has a magnet therein with its ends exposed toward the armature and a seat normally engaging in the second passage.

8. The combination set forth in claim 5, and a third fluid passage from the chamber through the side wall of the body, the first passage having an enlarged portion in which the armature is freely movable, and a portion reduced in diameter in which the stem has a sliding fit and from which portion the passage continues outwardly through the body, whereby when the diaphragm is depressed and the armature is lowered into the magnetic range of the magnetic seat member, said stem will be moved downwardly to close off the first passage.

9. A magnetic valve including a body having a chamber therein provided with a first pressure fluid passage at one end of said chamber and a second fluid passage leading through the body from said chamber, a movable seat member in the chamber normally engaging and closing the first fluid passage, the seat member being movable toward and away from said first fluid passage for closing and uncovering the same, the two fluid passages being in communication when the seat member uncovers the first fluid passage, movement limiting means in the chamber, the seat member being engageable with the limiting means to limit the movement of the seat member away from the first passage, a valve actuating member extending into the chamber and freely movable therein toward and from said seat member, one of said members including a magnet, said members being so constructed and arranged as to be attracted and magnetically coupled together by magnetic action when the actuating member is positioned sufficiently close to the seat member, and means for moving said actuating member toward the first passage into magnetic range with the seat member wherein coupling of said members is effected and for moving said actuating member away from the first passage and the movement limiting means a distance sufficient to break the magnetic coupling, the movement-limiting means being disposed in the path of movement of the seat member so as to effectuate separation of the two members when the actuating member has moved a predetermined distance away from the first fluid passage.

10. A magnetic valve as set forth in claim 9 wherein the actuating member includes a stem, the body having a port extending from the chamber receiving the stem and through which the stem is reciprocable, a third fluid passage leading from the wall of the port, and the stem covering and uncovering the third passage as it reciprocates in the port.

11. A magnetic valve as set forth in claim 9 wherein the means for moving the actuating member is a diaphragm connected to the actuating member, a spring biasing the diaphragm toward movement in one direction, and an enclosure for one side of the diaphragm having an opening on one wall for receiving a pressure fluid connection, pressure applied through said connection biasing the diaphragm toward movement in a direction opposite to the bias applied by the spring.

CLARENCE O. GLASGOW.

REFERENCES CITED

The following references are of record in the file of this patent:

UNITED STATES PATENTS

| Number | Name | Date |
|---|---|---|
| 2,231,158 | Davis | Feb. 11, 1941 |
| 2,339,087 | Mantz | Jan. 11, 1944 |
| 2,356,970 | Brockett | Aug. 29, 1944 |
| 2,412,725 | Fitch | Dec. 17, 1946 |